(12) United States Patent
Yao et al.

(10) Patent No.: US 12,732,254 B2
(45) Date of Patent: Sep. 8, 2026

(54) SYSTEMS, METHODS, AND NON-TRANSITORY PROCESSOR-READABLE MEDIA FOR DETERMINING PRECODING INFORMATION FOR UPLINK TRANSMISSIONS

(71) Applicant: ZTE CORPORATION, Shenzhen (CN)

(72) Inventors: Ke Yao, Shenzhen (CN); Bo Gao, Shenzhen (CN); Chuangxin Jiang, Shenzhen (CN); Zhaohua Lu, Shenzhen (CN); Meng Mei, Shenzhen (CN); Minqiang Zou, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 314 days.

(21) Appl. No.: 18/532,640

(22) Filed: Dec. 7, 2023

(65) Prior Publication Data

US 2024/0137089 A1 Apr. 25, 2024

Related U.S. Application Data

(63) Continuation of application No. PCT/CN2021/118201, filed on Sep. 14, 2021.

(51) Int. Cl.
*H04B 7/06* (2006.01)
*H04B 7/0456* (2017.01)

(52) U.S. Cl.
CPC .......... *H04B 7/063* (2013.01); *H04B 7/0486* (2013.01); *H04B 7/0634* (2013.01); *H04B 7/0639* (2013.01)

(58) Field of Classification Search
CPC .... H04B 7/063; H04B 7/0486; H04B 7/0634; H04B 7/0639; H04B 7/0404;
(Continued)

(56) References Cited

U.S. PATENT DOCUMENTS

2016/0301455 A1* 10/2016 Nammi ............... H04B 7/0469
2018/0183503 A1 6/2018 Rahman et al.
(Continued)

FOREIGN PATENT DOCUMENTS

CN 103532661 A 1/2014
CN 110036570 B 7/2021
(Continued)

OTHER PUBLICATIONS

Huawei et al., "Codebook based transmission for UL MIMO" 3GPP TSG RAN WG1 Meeting #88bis, R1-1705071, Apr. 7, 2017, Spokane, USA (8 pages).
(Continued)

*Primary Examiner* — Nizam U Ahmed
(74) *Attorney, Agent, or Firm* — Foley & Lardner LLP

(57) ABSTRACT

A wireless communication method includes receiving, by a wireless communication device from a network, at least one port parameter, determining, by the wireless communication device, at least one uplink codebook parameter, and determining, by the wireless communication device, a precoder for an uplink transmission based on the at least one uplink codebook parameter and the at least one port parameter.

16 Claims, 11 Drawing Sheets

(58) Field of Classification Search
CPC .. H04B 7/0469; H04B 7/0473; H04B 7/0691; H04B 7/0628; H04W 72/23
See application file for complete search history.

(56) References Cited

U.S. PATENT DOCUMENTS

| | | | | |
|---|---|---|---|---|
| 2020/0186215 | A1 | 6/2020 | Rahman et al. | |
| 2021/0050889 | A1* | 2/2021 | Park | H04B 7/0482 |

FOREIGN PATENT DOCUMENTS

| | | | |
|---|---|---|---|
| EP | 3 780 411 | A1 | 2/2021 |
| JP | 2020-504487 | A | 2/2020 |
| WO | WO-2020/075094 | A1 | 4/2020 |
| WO | WO-2021/034069 | A1 | 2/2021 |

OTHER PUBLICATIONS

International Search Report and Written Opinion for PCT Appl. No. PCT/CN2021/118201, mailed Jun. 10, 2022 (8 pages).

Extended European Search Report for EP Appl. No. 21957006.6, dated Jul. 2, 2024 (10 pages).

Catt, "On UL enhancements in Rel-18", 3GPP TSG RAN Meeting #93-e, RP-212257, Sep. 17, 2021, e-Meeting (4 pages).

Catt, "On UL MIMO enhancements in Rel-18", 3GPP TSG RAN Meeting #91-e, RP-210670, Mar. 26, 2021, e-Meeting (3 pages).

Nokia et al., "Enhancements on Multi-beam Operation", 3GPP TSG RAN WG1 #106-e, R1-2108052, Aug. 27, 2021, e-Meeting (30 pages).

NTT Docomo Inc., "Moderator%u2019s summary for discussion [RAN93e-R18Prep-02] UL enhancements", 3GPP TSG RAN#93e, RP-211652, Sep. 17, 2021, e-Meeting (89 pages).

RAN Vice-Chair (Deutsche Telekom), "Email discussion summary for [RAN-R18-WS-eMBB- Overall]", 3GPP TSG RAN Rel-18 workshop, RWS-210654, Jul. 2, 2021, e-Meeting (98 pages).

Examination Report No. 2 for AU Appl. No. 2021464873, dated Mar. 11, 2025 (4 pages).

Office Action for JP App. No. 2023-575556 mailed Jan. 24, 2025 (with English translation, 15 pages).

Notice of Reasons for Rejection for JP Appl. No. 2023-575556, dated Jun. 2, 2025 (with English translation, 7 pages).

Office Action for KR Appl. No. 10-2023-7042441, dated Jul. 2, 2025 (with English translation, 4 pages).

* cited by examiner

8TX(UE Tx Antenna Architecture)

Non-Coherent (Antenna)

Partial-Coherent (Antenna)

Full-Coherent (Antenna)

800

| Number of Bits | $i_{1,1}$ | $i_{1,2}$ | $i_{1,3}$ | $i_2$ |
|---|---|---|---|---|
| **Rank=1** | 3 | 0 | | 2 |
| **Rank=2** | 3 | 0 | 2 | 1 |
| **Rank=3** | 3 | 0 | 2 | 1 |
| **Rank=4** | 3 | 0 | 2 | 1 |
| **Rank=5** | 3 | 0 | | 1 |
| **Rank=6** | 3 | 0 | | 1 |
| **Rank=7** | 2 | 0 | | 1 |
| **Rank=8** | 2 | 0 | | 1 |

900

| Number of Bits | $i_{1,1}$ | $i_{1,2}$ | $i_{1,3}$ | $i_2$ |
|---|---|---|---|---|
| **Rank=1** | 2 | 0 | | 4*N |
| **Rank=2** | 2 | 0 | 2 | 3*N |
| **Rank=3** | 3 | 0 | 2 | 1*N |
| **Rank=4** | 3 | 0 | 2 | 1*N |
| **Rank=5** | 3 | 0 | | 1*N |
| **Rank=6** | 3 | 0 | | 1*N |
| **Rank=7** | 2 | 0 | | 1*N |
| **Rank=8** | 2 | 0 | | 1*N |

| | | |
|---|---|---|
| **4-port TPMI=14 Precoder** | 1 | **8-port Precoder** |
| | 1 | |
| | -1 | |
| | -1 | |
| **4-port TPMI=20 Precoder** | 1 | |
| | -1 | |
| | 1 | |
| | -1 | |

| Rank=1 4-port TPMI=14 Precoder | |
|---|---|
| | 1 |
| | 1 |
| | -1 |
| | -1 |

| Rank=2 4-port TPMI=16 Precoder | | |
|---|---|---|
| | 1 | 1 |
| | j | j |
| | 1 | -1 |
| | j | -j |

| 8-port Precoder | | |
|---|---|---|
| | 1 | 0 |
| | 1 | 0 |
| | -1 | 0 |
| | -1 | 0 |
| | 1 | 1 |
| | j | j |
| | 1 | -1 |
| | j | -j |

| 8-port Precoder | |
|---|---|
| | 1 |
| | 1 |
| | -1 |
| | -1 |
| | 1 |
| | -1 |
| | 1 |
| | -1 |

| 8-port Pattern | |
|---|---|
| | 1 |
| | 0 |
| | 1 |
| | 0 |
| | 1 |
| | 0 |
| | 1 |
| | 0 |

Pattern

| 8-Port Full-Coherent Precoder | | | | 8-Port Partial-Coherent or Non-Coherent Precoder | |
|---|---|---|---|---|---|
| | 1 | * | 1 | | 1 |
| | 1 | * | 0 | | 0 |
| | -1 | * | 1 | | -1 |
| | -1 | * | 0 | | 0 |
| | 1 | * | 1 | | 1 |
| | -1 | * | 0 | | 0 |
| | 1 | * | 1 | | 1 |
| | -1 | * | 0 | | 0 |

| Number of Patterns | | |
|---|---|---|
| Full-coherent | Non-coherent | Partial-coherent |
| 1 | 8 | 8 |
| 1 | 4 | 4 |
| 1 | 2 | 2 |
| 1 | 2 | 1 |
| 1 | 2 | 1 |
| 1 | 2 | 1 |
| 1 | 1 | 1 |
| 1 | 1 | |

| Number of Bits | $i_{1,1}$ | $i_{1,2}$ | $i_{1,3}$ | $i_2$ | Pattern |
|---|---|---|---|---|---|
| Rank=1 | 3 | 0 | | 2 | 4 |
| Rank=2 | 3 | 0 | 2 | 1 | 3 |
| Rank=3 | 3 | 0 | 2 | 1 | 3 |
| Rank=4 | 3 | 0 | 2 | 1 | 2 |
| Rank=5 | 3 | 0 | | 1 | 2 |
| Rank=6 | 3 | 0 | | 1 | 2 |
| Rank=7 | 2 | 0 | | 1 | 2 |
| Rank=8 | 2 | 0 | | 1 | 1 |

| Rank=1 4-port Precoder TPMI=14 | |
|---|---|
| | 1 |
| | 1 |
| | -1 |
| | -1 |

| Rank=2 4-port Precoder TPMI=16 | | |
|---|---|---|
| | 1 | 1 |
| | j | j |
| | 1 | -1 |
| | j | -j |

| Rank=3 8-port Precoder | | | |
|---|---|---|---|
| | 1 | 0 | 0 |
| | 1 | 0 | 0 |
| | -1 | 0 | 0 |
| | -1 | 0 | 0 |
| | 0 | 1 | 1 |
| | 0 | j | j |
| | 0 | 1 | -1 |
| | 0 | j | -j |

| | Maxrank=4 | | Maxrank=8 | |
|---|---|---|---|---|
| Index | Port Group 1 | Port Group 2 | Port Group 1 | Port Group 2 |
| 0 | 0 | 1 | 0 | 1 |
| 1 | 0 | 2 | 0 | 2 |
| 2 | 0 | 3 | 0 | 3 |
| 3 | 0 | 4 | 0 | 4 |
| 4 | 1 | 0 | 1 | 0 |
| 5 | 1 | 1 | 1 | 1 |
| 6 | 1 | 2 | 1 | 2 |
| 7 | 1 | 3 | 1 | 3 |
| 8 | 2 | 0 | 1 | 4 |
| 9 | 2 | 1 | 2 | 0 |
| 10 | 2 | 2 | 2 | 1 |
| 11 | 3 | 0 | 2 | 2 |
| 12 | 3 | 1 | 2 | 3 |
| 13 | 4 | 0 | 2 | 4 |
| 14 | | | 3 | 0 |
| 15 | | | 3 | 1 |
| 16 | | | 3 | 2 |
| 17 | | | 3 | 3 |
| 18 | | | 3 | 4 |
| 19 | | | 4 | 0 |
| 20 | | | 4 | 1 |
| 21 | | | 4 | 2 |
| 22 | | | 4 | 3 |
| 23 | | | 4 | 4 |

FIG. 18

SYSTEMS, METHODS, AND NON-TRANSITORY PROCESSOR-READABLE MEDIA FOR DETERMINING PRECODING INFORMATION FOR UPLINK TRANSMISSIONS

CROSS-REFERENCE TO RELATED APPLICATION

This application claims the benefit of priority under 35 U.S.C. § 120 as a continuation of International Patent Application No. PCT/CN2021/118201, filed on Sep. 14, 2021, the disclosure of which is incorporated herein by reference in its entirety.

TECHNICAL FIELD

The disclosure relates generally to wireless communications and, more particularly, to systems, methods, and non-transitory processor-readable media for determining precoding information for uplink transmissions.

BACKGROUND

New Radio (NR) technology of Fifth Generation (5G) mobile communication systems supports high-frequency bands. Although high-frequency bands have abundant frequency domain resources, wireless signals in high frequency bands decay relatively quickly. Therefore, the coverage area of the wireless signals in high frequency bands is relatively small. High-frequency signals transmitted in a certain beam mode can concentrate energy of those signals in a relatively small spatial range to improve the coverage of the high-frequency signals.

SUMMARY

In some arrangements, systems, methods, apparatuses, and non-transitory computer-readable media allow receiving, by a wireless communication device from a network, at least one port parameter, determining, by the wireless communication device, at least one uplink codebook parameter, and determining, by the wireless communication device, a precoder for an uplink transmission based on the at least one uplink codebook parameter and the at least one port parameter.

In some arrangements, systems, methods, apparatuses, and non-transitory computer-readable media allow sending, by a network to a wireless communication device, at least one port parameter, sending, by the network to the wireless communication device, at least one uplink codebook parameter, and receiving, by the network from the wireless communication device, an uplink transmission, wherein the uplink transmission is transmitted by the wireless communication based on a precoder determined according to the at least one port parameter and the at least one uplink codebook parameter.

The above and other aspects and their implementations are described in greater detail in the drawings, the descriptions, and the claims.

BRIEF DESCRIPTION OF THE DRAWINGS

Various example arrangements of the present solution are described in detail below with reference to the following figures or drawings. The drawings are provided for purposes of illustration only and merely depict example arrangements of the present solution to facilitate the reader's understanding of the present solution. Therefore, the drawings should not be considered limiting of the breadth, scope, or applicability of the present solution. It should be noted that for clarity and ease of illustration, these drawings are not necessarily drawn to scale.

FIG. 9 is a table illustrating a number of bits in a DCI for codebook mode 2, in accordance with some arrangements.

FIG. 10 is a table illustrating a method for determining a precoder by combining two precoders with the same rank, in accordance with some arrangements.

FIG. 11 is a table illustrating a method for determining a precoder by combining two precoders with different ranks, in accordance with some arrangements.

FIG. 12 is a table illustrating an 8-port precoder for full coherent ports, in accordance with some arrangements.

FIG. 13 is a table illustrating an example pattern indication, in accordance with some arrangements.

FIG. 14 is a table illustrating an 8-port precoder for partial-coherent or non-coherent ports, in accordance with some arrangements.

FIG. 15 a table illustrating a number of patterns, in accordance with some arrangements.

FIG. 16 is a table illustrating examples of bits in DCI signaling through which a network indicates patterns shown in FIG. 15, in accordance with some arrangements.

FIG. 17 is a table illustrating a method for determining a precoder by combining two precoders with different ranks, in accordance with some arrangements.

FIG. 18 is a table illustrating joint indication based on index values, in accordance with some arrangements.

DETAILED DESCRIPTION

Various example arrangements of the present solution are described below with reference to the accompanying figures to enable a person of ordinary skill in the art to make and use the present solution. As would be apparent to those of ordinary skill in the art, after reading the present disclosure, various changes or modifications to the examples described herein can be made without departing from the scope of the present solution. Thus, the present solution is not limited to the example arrangements and applications described and illustrated herein. Additionally, the specific order or hierarchy of steps in the methods disclosed herein are merely example approaches. Based upon design preferences, the specific order or hierarchy of steps of the disclosed methods or processes can be re-arranged while remaining within the scope of the present solution. Thus, those of ordinary skill in the art will understand that the methods and techniques disclosed herein present various steps or acts in a sample order, and the present solution is not limited to the specific order or hierarchy presented unless expressly stated otherwise.

One of the key features of the New Radio (NR) technology of Fifth Generation (5G) mobile communication systems is the support of high-frequency bands. High-frequency bands have abundant frequency domain resources, but wireless signals in high-frequency bands decay quickly, and coverage of the high-frequency signals is therefore small. Transmission of high-frequency signals in a certain beam mode allows the energy of those signals to be concentrated in a relatively small spatial range to improve the coverage of the high-frequency signals. Furthermore, a BS (e.g., an NR Node B (gNB)) configured with multiple Transmission Reception Points (TRPs) or a wireless communication device (e.g., a User Equipment (UE)) configured with multiple panels can utilize a plurality of candidate beam pairs, which can improve throughput and robustness.

An uplink transmission (e.g., a Physical Uplink Shared Channel (PUSCH) transmission) is scheduled based on Sounding Reference Signal (SRS) transmission. One or more SRS resources are configured in an SRS resource set with a usage of beam management, antenna switching, codebook, or non-codebook to UE by network (e.g., by at least one gNB) via Radio Resource Control (RRC) signaling for codebook-based PUSCH transmission or non-codebook-based PUSCH transmission, respectively. Arrangements disclosed herein relate to schemes for determining and/or using precoding matrix (codebook), rank and Transmitted Precoding Matrix Indicator (TPMI) indication, and frequency selective (sub-band) precoding for 6Tx antenna port transmissions and 8Tx antenna port transmissions.

Figure 1:
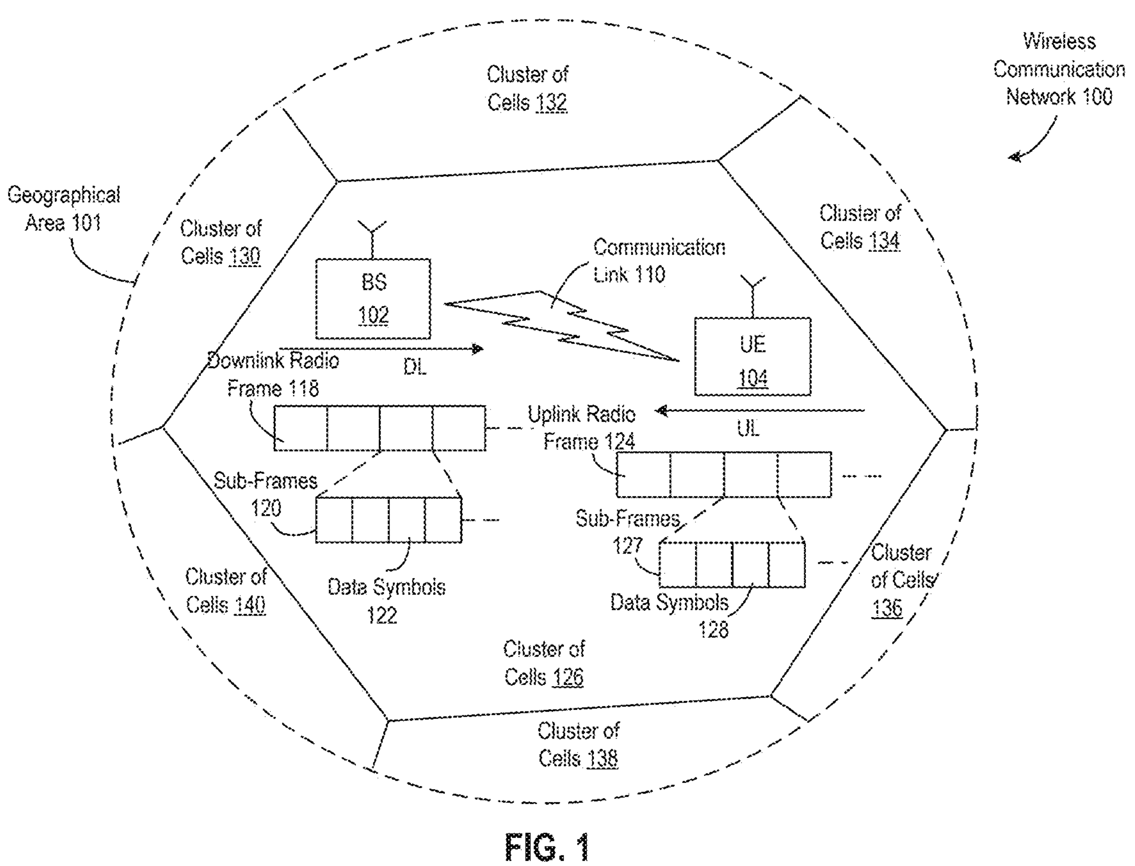
FIG. 1 is a diagram illustrating an example cellular communication network, in accordance with some arrangements.

FIG. 1 illustrates an example wireless communication network and/or system 100, in accordance with an arrangement of the present disclosure. In the following discussion, the wireless communication network 100 may be any wireless network, such as a cellular network or a narrowband Internet of things (NB-IoT) network. The network 100 includes a BS 102 and a UE 104 that can communicate with each other via a communication link 110 (e.g., a wireless communication channel), and a cluster of cells 126, 130, 132, 134, 136, 138 and 140 overlaying a geographical area 101. In FIG. 1, the BS 102 and UE 104 are shown to be located within a respective geographic boundary of cell 126. Each of the other cells 130, 132, 134, 136, 138 and 140 may include at least one BS operating at its allocated bandwidth to provide adequate radio coverage to its intended users.

For example, the BS 102 may operate at an allocated channel transmission bandwidth to provide adequate coverage to the UE 104. The BS 102 and the UE 104 may communicate via a downlink radio frame 118, and an uplink radio frame 124 respectively. Each radio frame 118/124 may be further divided into sub-frames 120/127 which may include data symbols 122/128. In the present disclosure, the BS 102 and UE 104 are described herein as non-limiting examples of "communication nodes," generally, which can practice the methods disclosed herein. Such communication nodes may be capable of wireless and/or wired communications, in accordance with various arrangements of the present solution.

Figure 2:
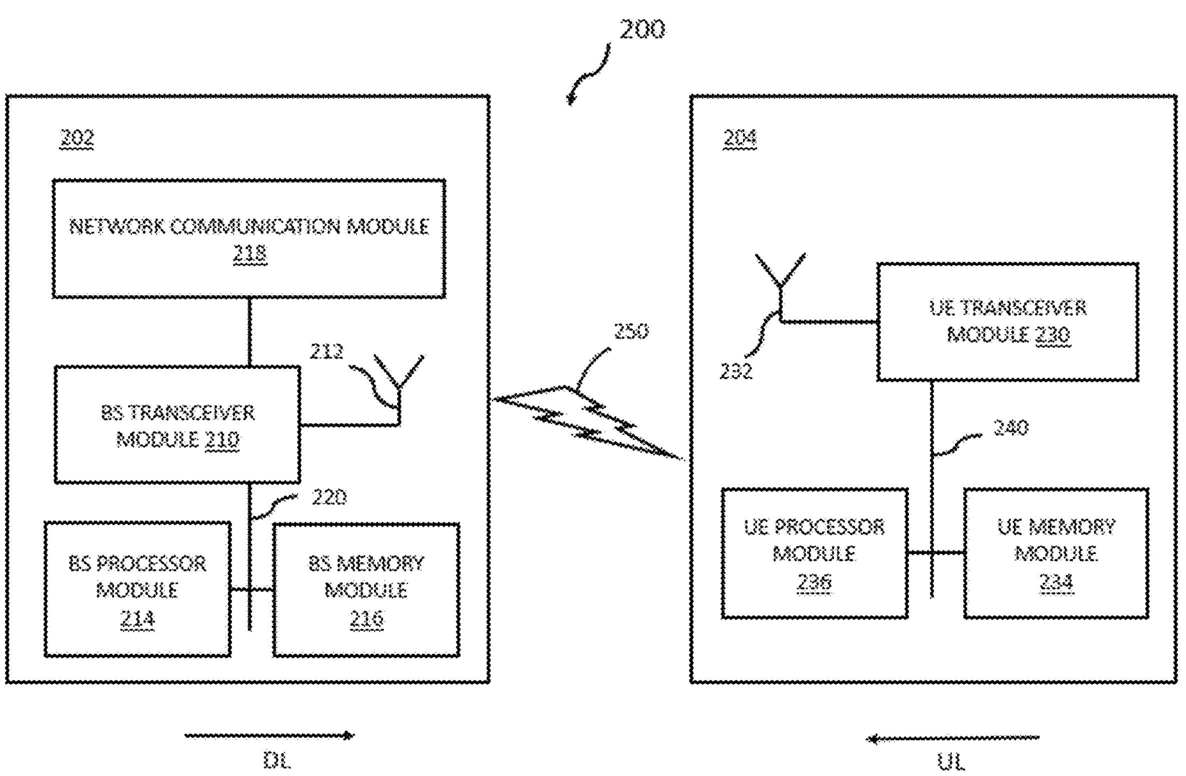
FIG. 2 illustrates block diagrams of an example base station and an example user equipment device, in accordance with some arrangements.

FIG. 2 illustrates a block diagram of an example wireless communication system 200 for transmitting and receiving wireless communication signals, e.g., OFDM/OFDMA signals, in accordance with some arrangements of the present solution. The system 200 may include components and elements configured to support known or conventional operating features that need not be described in detail herein. In one illustrative arrangement, system 200 can be used to communicate (e.g., transmit and receive) data symbols in a wireless communication environment such as the wireless communication environment 100 of FIG. 1, as described above.

System 200 generally includes a BS 202 and a UE 204. The BS 202 includes a BS (base station) transceiver module 210, a BS antenna 212, a BS processor module 214, a BS memory module 216, and a network communication module 218, each module being coupled and interconnected with one another as necessary via a data communication bus 220. The UE 204 includes a UE transceiver module 230, a UE antenna 232, a UE memory module 234, and a UE processor module 236, each module being coupled and interconnected with one another as necessary via a data communication bus 240. The BS 202 communicates with the UE 204 via a communication channel 250, which can be any wireless channel or other medium suitable for transmission of data as described herein.

As would be understood by persons of ordinary skill in the art, system 200 may further include any number of modules other than the modules shown in FIG. 2. Those skilled in the art will understand that the various illustrative blocks, modules, circuits, and processing logic described in connection with the arrangements disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software can depend upon the particular application and design constraints imposed on the overall system. Those familiar with the concepts described herein may implement such functionality in a suitable manner for each particular application, but such implementation decisions should not be interpreted as limiting the scope of the present disclosure.

In accordance with some arrangements, the UE transceiver 230 may be referred to herein as an uplink transceiver 230 that includes a radio frequency (RF) transmitter and a RF receiver each comprising circuitry that is coupled to the antenna 232. A duplex switch (not shown) may alternatively couple the uplink transmitter or receiver to the uplink antenna in time duplex fashion. Similarly, in accordance with some arrangements, the BS transceiver 210 may be referred to herein as a downlink transceiver 210 that includes a RF transmitter and a RF receiver each comprising circuity that is coupled to the antenna 212. A downlink duplex switch may alternatively couple the downlink transmitter or receiver to the downlink antenna 212 in time duplex fashion. The operations of the two transceiver modules 210 and 230 can be coordinated in time such that the uplink receiver circuitry is coupled to the uplink antenna 232 for reception of transmissions over the wireless transmission link 250 at the same time that the downlink transmitter is coupled to the downlink antenna 212. In some arrangements, there is close time synchronization with a minimal guard time between changes in duplex direction.

The UE transceiver 230 and the base station transceiver 210 are configured to communicate via the wireless data communication link 250, and cooperate with a suitably configured RF antenna arrangement 212/232 that can support a particular wireless communication protocol and modulation scheme. In some illustrative arrangements, the UE transceiver 210 and the base station transceiver 210 are configured to support industry standards such as the Long Term Evolution (LTE) and emerging 5G standards, and the like. It is understood, however, that the present disclosure is not necessarily limited in application to a particular standard and associated protocols. Rather, the UE transceiver 230 and the base station transceiver 210 may be configured to support alternate, or additional, wireless data communication protocols, including future standards or variations thereof.

In accordance with various arrangements, the BS 202 may be an gNB, evolved node B (eNB), a serving eNB, a target eNB, a femto station, or a pico station, for example. In some arrangements, the UE 204 may be embodied in various types of user devices such as a mobile phone, a smart phone, a personal digital assistant (PDA), tablet, laptop computer, wearable computing device, etc. The processor modules 214 and 236 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a method or algorithm described in connection with the arrangements disclosed herein may be embodied directly in hardware, in firmware, in a software module executed by processor modules 214 and 236, respectively, or in any practical combination thereof. The memory modules 216 and 234 may be realized as RAM memory, flash memory, ROM memory, EPROM memory, EEPROM memory, registers, a hard disk, a removable disk, a CD-ROM, or any other form of storage medium known in the art. In this regard, memory modules 216 and 234 may be coupled to the processor modules 210 and 230, respectively, such that the processors modules 210 and 230 can read information from, and write information to, memory modules 216 and 234, respectively. The memory modules 216 and 234 may also be integrated into their respective processor modules 210 and 230. In some arrangements, the memory modules 216 and 234 may each include a cache memory for storing temporary variables or other intermediate information during execution of instructions to be executed by processor modules 210 and 230, respectively. Memory modules 216 and 234 may also each include non-volatile memory for storing instructions to be executed by the processor modules 210 and 230, respectively.

The network communication module 218 generally represents the hardware, software, firmware, processing logic, and/or other components of the base station 202 that enable bi-directional communication between base station transceiver 210 and other network components and communication nodes configured to communication with the base station 202. For example, network communication module 218 may be configured to support internet or WiMAX traffic. In a typical deployment, without limitation, network communication module 218 provides an 802.3 Ethernet interface such that base station transceiver 210 can communicate with a conventional Ethernet based computer network. In this manner, the network communication module 218 may include a physical interface for connection to the computer network (e.g., Mobile Switching Center (MSC)). The terms "configured for," "configured to" and conjugations thereof, as used herein with respect to a specified operation or function, refer to a device, component, circuit, structure, machine, signal, etc., that is physically constructed, programmed, formatted and/or arranged to perform the specified operation or function.

Similar to downlink codebook architecture, for UE transmission (Tx) antenna architecture which includes for example 2Tx, 4Tx, 6Tx, and 8Tx, coherent Tx antenna ports are usually arranged to be cross-polarized. Tx antenna architectures with non-coherent, partial coherent, and full coherent capability are shown in FIGS. 3A-6C. In FIGS. 3A-6C, the one or more Tx antennas (each shown as "x") within a dashed box are coherent.

Figures 3A, 3B, 4A, 4B, 4C, 5A, 5B, 5C:
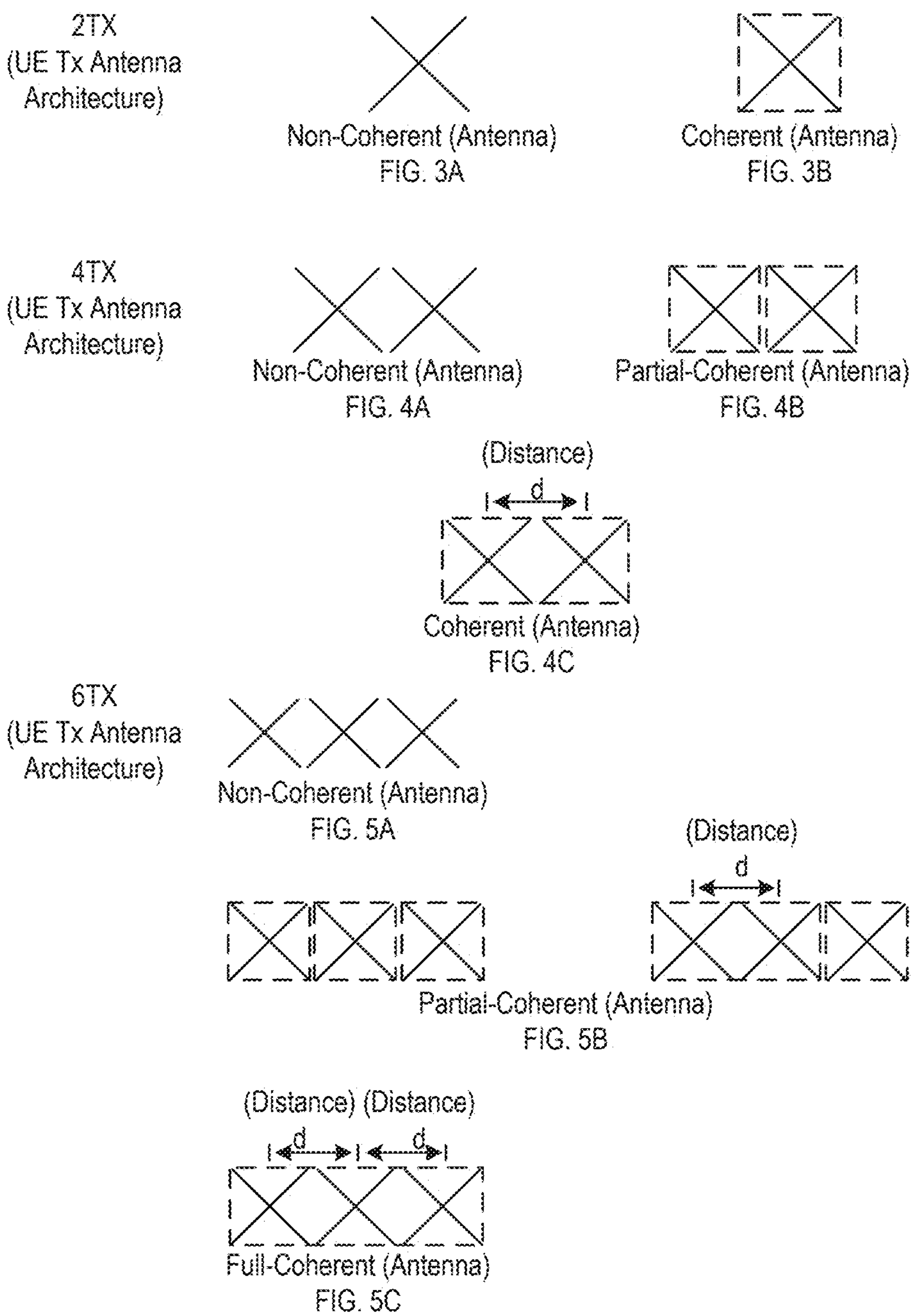
FIG. 3A is a diagram illustrating UE Tx antenna architecture 2Tx that is non-coherent, in accordance with some arrangements.
FIG. 3B is a diagram illustrating UE Tx antenna architecture 2Tx that is coherent, in accordance with some arrangements.
FIG. 4A is a diagram illustrating UE Tx antenna architecture 4Tx that is non-coherent, in accordance with some arrangements.
FIG. 4B is a diagram illustrating UE Tx antenna architecture 4Tx that is partially-coherent, in accordance with some arrangements.
FIG. 4C is a diagram illustrating UE Tx antenna architecture 4Tx that is full-coherent, in accordance with some arrangements.
FIG. 5A is a diagram illustrating UE Tx antenna architecture 6Tx that is non-coherent, in accordance with some arrangements.
FIG. 5B is a diagram illustrating UE Tx antenna architecture 6Tx that is partially-coherent, in accordance with some arrangements.
FIG. 5C is a diagram illustrating UE Tx antenna architecture 6Tx that is full-coherent, in accordance with some arrangements.

FIG. 3A is a diagram illustrating UE Tx antenna architecture 2Tx that is non-coherent, in accordance with some arrangements. FIG. 3B is a diagram illustrating UE Tx antenna architecture 2Tx that is full-coherent, in accordance with some arrangements. UE Uplink 2Tx antenna port transmissions need only non-coherent and full-coherent antennas.

FIG. 4A is a diagram illustrating UE Tx antenna architecture 4Tx that is non-coherent, in accordance with some arrangements. FIG. 4B is a diagram illustrating UE Tx antenna architecture 4Tx that is partially-coherent, in accordance with some arrangements. FIG. 4C is a diagram illustrating UE Tx antenna architecture 4Tx that is full-coherent, in accordance with some arrangements. UE Uplink 4Tx antenna port transmissions need to use non-coherent, partial-coherent, and full-coherent antennas. For partial-coherent antennas, the combination {2, 2} is shown. For full-coherent antennas, distance d between two groups of cross-polarization can be $\lambda/2$ or another (e.g., $K^*\lambda$, or another value for distributed antennas, such as Heterogeneous or UE aggregation), where $\lambda$ is wavelength of the transmitted uplink signals. In some examples, each Tx beam is polarization-common. A single phase value applies to at least one precoder of all antennas with the same polarization (e.g., per layer).

FIG. 5A is a diagram illustrating UE Tx antenna architecture 6Tx that is non-coherent, in accordance with some arrangements. FIG. 5B is a diagram illustrating UE Tx antenna architecture 6Tx that is partially-coherent, in accordance with some arrangements. FIG. 5C is a diagram illustrating UE Tx antenna architecture 6Tx that is full-coherent, in accordance with some arrangements. For partial-coherent antennas, combinations {2, 2, 2}, {4, 2} as shown can be considered.

Figure 6A:
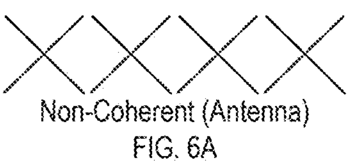
FIG. 6A is a diagram illustrating UE Tx antenna architecture 8Tx that is non-coherent, in accordance with some arrangements.
Figure 6B:
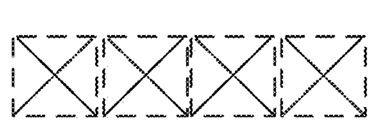
FIG. 6B is a diagram illustrating UE Tx antenna architecture 8Tx that is partially-coherent, in accordance with some arrangements.
Figure 6B:
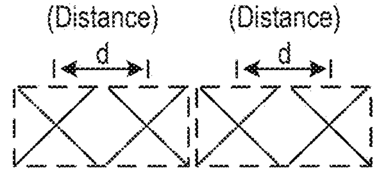
Figure 6B:
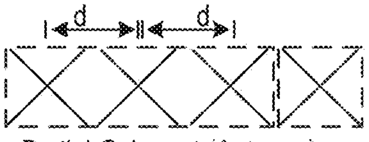
Figure 6C:
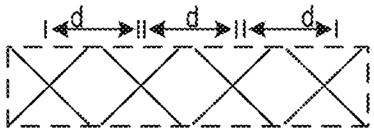
FIG. 6C is a diagram illustrating UE Tx antenna architecture 8Tx that is full-coherent, in accordance with some arrangements.
Figure 6C:
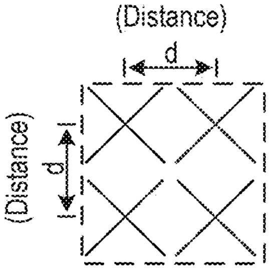

FIG. 6A is a diagram illustrating UE Tx antenna architecture 8Tx that is non-coherent, in accordance with some arrangements. FIG. 6B is a diagram illustrating UE Tx antenna architecture 8Tx that is partially-coherent, in accordance with some arrangements. FIG. 6C is a diagram illustrating UE Tx antenna architecture 8Tx that is full-coherent, in accordance with some arrangements. For partial coherent antennas, combinations of {2, 2, 2, 2}, {4, 4}, {6, 2} as shown can be considered.

Figures 7, 8:
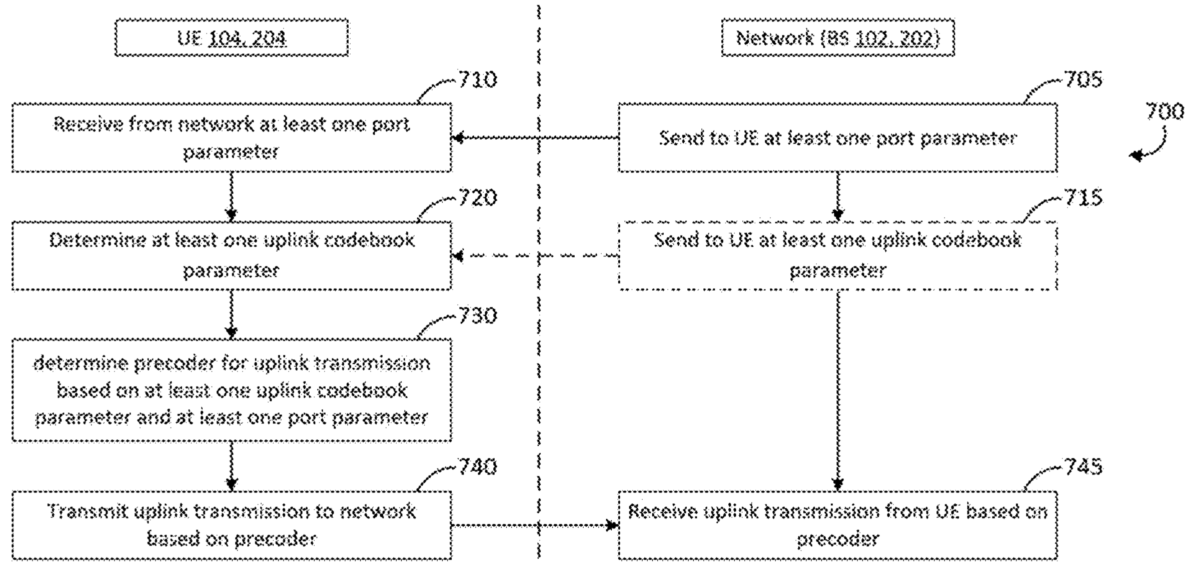
FIG. 7 is a flow diagram illustrating an example method for determining a precoder for an uplink transmission of the UE, in accordance with some arrangements.
FIG. 8 is a table illustrating a number of bits in a DCI for codebook mode 1, in accordance with some arrangements.

Some arrangements are directed to a full-coherent codebook. FIG. 7 is a flow diagram illustrating an example method 700 for determining a precoder for an uplink transmission of the UE, in accordance with some arrangements. Blocks 710, 720, 730, and 740 are performed by a UE, e.g., the UE 104 or 204. Blocks 705, 715, and 745 may be performed by the network (e.g., the BS 102 or 202).

At 705, the network sends at least one port parameter to the UE. At 710, the UE receives from the network the at least one port parameter. In some arrangements, each of the at least one port parameter is associated with a port (also referred to as an antenna port) of the UE.

At 720, the UE determines at least one uplink codebook parameter. In some arrangements, the network sends the at least one uplink codebook parameter to the UE at 715, and determining the at least one uplink codebook parameter at 720 includes the UE receiving the at least one uplink codebook parameter from the network. In some arrangements, the UE determines the at least one uplink codebook parameter without having receiving it from the network.

At 730, the UE determines a precoder for an uplink transmission based on the at least one uplink codebook parameter and the at least one port parameter. The precoder can also be referred to as a precoding matrix, precoding, precoding information, codebook, and so on. At 740, the UE transmits the uplink transmission to the network based on the precoder. At 745, the network receives the uplink transmission from the UE.

In some arrangements, the precoder can be determined based on a downlink Precoding Matrix Indicator (PMI) Type I scheme. In such arrangements, a full-size codebook is first obtained. For example, with parameters such as, N1, N2, O1, O2, a codebook for a maximum number of ports can be determined for ports of the UE that are full-coherent. In some examples, with a pattern, the UE can generate a codebook for partial-coherent ports or non-coherent ports. The pattern can be predefined or can be configured or indicated by the network.

With respect to 705 and 710, in some arrangements, the at least one port parameter includes one or more of (1) at least one maximum number of ports, (2) at least one coherent information, e.g., the coherence (non-coherent, partial-coherent, or full-coherent) of these ports), (3) at least one maximum rank value, (4) a maximum total rank value, or (5) a number of port groups. The maximum rank value refers a value for the maximum rank for each port group (e.g., the maximum rank value for group 1 is 4, the maximum rank value for group 2 is 4, and so on). The maximum total rank value refers to the largest rank value among all rank values of port all groups (e.g., the max total rank for group 1 and group 2 is 4 in the examples in which group 1 and/or group 2 are used to transmit signals simultaneously).

In some examples, an example of a maximum number of ports include 2, 4, 6, and 8. In some examples, the maximum number of ports can be configured to a given SRS resource in a SRS resource set. In some examples, examples of the maximum rank value include but are not limited to, 1, 2, 4, or 8. In some examples, the maximum rank value can be equal to or less than the max number of ports. In some examples, a port group can also be or referred to as a panel, a transmit port group, or an antenna port group.

In some examples, the at least one port parameter is defined per port group. For example, one or more of the maximum number of ports, the coherence information, or the maximum rank value is configured, indicated, or otherwise communicated by the network for each port group. In some arrangements, each of the at least one maximum number of ports corresponds to a respective port group. For example, each of the at least one maximum number of ports corresponds to a respective one of port groups according to an order (e.g., correspondence determined based on an order of the at least one maximum number of ports and/or an order of the port groups). In some arrangements, each of the at least one coherence information corresponds to a respective port group. For example, each of the at least one coherence information corresponds to a respective one of the port groups according to an order (e.g., correspondence determined based on an order of the at least one coherence information and/or an order of the port groups). In some arrangements, each of the at least one maximum rank value corresponds to a respective port group. For example, each of the at least one maximum rank value corresponds to a respective one of the port groups according to an order (e.g., correspondence determined based on an order of the at least one maximum rank value and/or an order of the port groups). In some arrangements, the maximum total rank value corresponds to all port groups.

In some arrangements, the at least one port parameter is reported by the UE to the network. That is, the UE can first report its panel or multi-panel capabilities to the network. In response to receiving the at least one reported port parameter, the network configures or indicates at least one reported port parameter based on UE's capability as reported.

In some arrangements, the UE reports an indication of a capability of the UE to simultaneously transmit and receive transmissions using more than one port group. That is, the UE can first report its panel or multi-panel capabilities to the network. In response to receiving such indication, the network configures or indicates at least one port parameter and configures, indicates, or otherwise communicates the same to the UE based on UE's capability as reported.

With respect to determining the at least one uplink codebook parameter at 720, in some examples, the at least one uplink codebook parameter includes either or both of at least one set of parameters for codebook selection or at least one set of parameters for codebook set generation.

The at least one uplink codebook parameter can be communicated or otherwise delivered by the network to the UE via suitable signaling, e.g., one or more of Radio Resource Control (RRC) signaling, Media Access Control (MAC) Control Element (CE) signaling, or Downlink Control Information (DCI) signaling. In some examples, the parameters for codebook selection can be delivered via DCI signaling. In some examples, the parameters for codebook set generation can be delivered via RRC signaling or MAC CE signaling. Furthermore, a first part or some parameters of the parameters for codebook set generation or codebook selection can be delivered via RRC signaling while a second part or other parameters of the parameters for codebook set generation or codebook selection can be delivered via another RRC signaling, in a MAC CE signaling, or in a DCI signaling.

With respect to the set of parameters for codebook selection, if two or more codebooks (e.g., a codebook set) are generated or predefined, the set of parameters for codebook selection may be needed to select one codebook from the two or more codebooks. In some arrangements, the set of parameters for codebook selection can be indicated dynamically by the network, for example, via signaling such as one or more of RRC signaling, DCI signaling, or MAC CE signaling. In the example in which a codebook set is generated using DL Type 1 method, the set of parameters for codebook selection includes $i_1$, and $i_2$. In some examples, $i_1$ is further determined according to one or more of parameters $i_{1,1}$, $i_{1,2}$, or $i_{1,3}$, and so on. In the example in which the codebook set is predefined, the set of parameters for codebook selection includes TPMI.

For instance, the network can configure (e.g., via a RRC signaling) or indicate (e.g., via DCI signaling or MAC CE signaling) for the UE parameters for codebook selection for an uplink transmission, including one or more of a rank value, a TPMI, at least one index to indicate a vector or a matrix from a set of DFT vectors (e.g., $i_{1,1}$, $i_{1,2}$, and $i_{1,3}$), at least one index (such as $i_2$) indicating a set of coefficients (e.g., for codebook mode 2, there can be two or more $i_2$), and at least one number of bits in the DCI.

FIG. 8 is a table 800 illustrating a number of bits in a DCI for codebook mode 1, in accordance with some arrangements. FIG. 9 is a table 900 illustrating a number of bits in a DCI for codebook mode 2, in accordance with some arrangements. The examples of number of bits in DCI shown in tables 800 and 900 are for $N_1=4$, $O_1=2$, $N_2=1$, $O_2=1$. In the table 900, N is the number of $i_2$. Given that the overhead of i1,1, i1,2, i1,3. and i2 shown in tables 800 and 900 is not fixed, the DCI overhead can dynamically change for different parameters, such as for different rank values. Thus, in order to reduce complexity for the UE, the number of bits for fields in DCI can be fixed with a max length determined according to parameters configured by the network.

In the examples in which the codebook is generated using DL Type 1 method, the set of parameters for codebook set generation includes parameters such as one or more of N1, N2, O1, and O2. N1 is defined as a number of horizontal antenna elements on one polarization. N2 is defined as a number of vertical antenna elements on one polarization. O1 is defined as a value of an oversampling factor on one polarization in a horizontal direction. O2 is defined as a value of oversampling factor on one polarization in a vertical direction. In some arrangements, the set of parameters for codebook generation further includes an identifier or indication of at least one codebook mode (e.g., codebook mode 1, codebook mode 2, or so on) in the examples in which two or more codebooks mode are supported by the UE. The different codebook modes correspond to different methods for generating a codebook.

In some arrangements, each set of the at least one set of parameters for codebook selection corresponds to a respective port group. For example, each set of the at least one set of parameters for codebook selection corresponds to a respective one of port groups according to an order (e.g., correspondence determined based on an order of the at least one set of parameters for codebook selection and/or an order of the port groups). In some arrangements, each set of the at least one set of parameters for codebook set generation corresponds to a respective port group. For example, each set of the at least one set of parameters for codebook set generation corresponds to a respective one of port groups according to an order (e.g., correspondence determined based on an order of the at least one set of parameters for codebook set generation and/or an order of the port groups). In some arrangements in which one codebook mode is provided by the network, that codebook mode corresponds to all port groups. That is, the same codebook mode provided by the network is applicable to each of the port groups. In some arrangements in which two or more codebook modes are provided by the network, each of the two or more codebook mode corresponds to a respective port group. For example, each of the two or more codebook modes corresponds to a respective one of port groups according to an order (e.g., correspondence determined based on an order of the two or more codebook modes and/or an order of the port groups). Thus, one or more of (1) the at least one set of parameters for codebook selection, (2) the at least one set of parameters for codebook set generation, or (3) the at least one codebook mode is configured, indicated, or otherwise communicated by the network for each port group.

With respect to determining the precoder for the uplink transmission at 730, in some arrangements, the UE determines the precoder according to one codebook based on the at least one uplink codebook parameter and the at least one port parameter. In some arrangements, the precoder is determined according to at least one codebook based on the at least one uplink codebook parameter and the at least one port parameter. In some examples, each of the at least one codebook corresponds to a respective port group of at least one port group. In some examples, the UE determines each of the at least one codebook using a set of parameters for codebook selection of a port group to select a codebook from a codebook set of the port group. In some examples, the UE determines the codebook set using a predefined method or generated according to the parameters for codebook set generation.

In some arrangements, the precoder can be determined based on at least one port group. Smaller sized codebooks are first obtained for each port group, for example, based on N1, N2, O1, O2 for each group or based on a predefined table (e.g., a 4/2 port codebook table). Then, such codebooks are combined based on a certain mapping pattern. For example, the precoder can be determined based on a first 4-port group and a second 4-port group.

With respect to blocks 705 and 710, in some arrangements, the at least one port parameter includes one or more of (1) at least one maximum number of ports, (2) at least one coherent information, e.g., the coherence (non-coherent, partial-coherent, or full-coherent) of these ports), (3) at least one maximum rank value, (4) a maximum total rank value, or (5) a number of port groups. The network configures or indicates to the UE at least one port group, which is also referred as an antenna port group, Tx group, and so on. In some examples, a port group corresponds to a panel (also referred as an antenna panel), a panel entity, a panel configuration index, an antenna configuration index, or an antenna group configuration index. In some examples, a port group corresponds to a type of panel entity, a type of antenna configuration, a type of antenna port configuration, or a type of antenna group configuration. In some examples, the UE can determine a port group to be active or inactive, for example, according to parameters configured or indicated by the network (e.g., a gNB) or according to a panel status determined by the UE itself. In response to determining that a port group is inactive due to panel state, the UE does not include the codebook for the inactive port group in determining the precoder. That is, the codebook for the inactive port group is excluded from the one or more codebooks that are combined to determine the precoder. In some examples, two or more ports in each port group are coherent with each other. A coherent port can function as a partial-coherent port and a non-coherent port.

In some arrangements, the network configures for or indicates to the UE a number of the at least one port group. For each of such at least one port group, the network configures for or indicates to the UE at least one of (1) a maximum rank, (2) maximum number of ports, (3) at least one coherent information, e.g., the coherence (non-coherent, partial-coherent, or full-coherent) of these ports). In some examples, the maximum rank include but are not limited to, 1, 2, 4, or 8. In some examples, an example of a maximum number of ports include 2, 4, 6, and 8.

In some arrangements, the at least one uplink codebook parameter determined at 720 includes a set of parameters for codebook selection for each the at least one port group. For example, the network may indicate to the UE the set of parameters for codebook selection for each the at least one port group. In some arrangements, each port group corresponds to one small-scale codebook, which is indicated through a set of parameters for codebook selection for the port group. The small-scale codebook for each port group can be used to form a large-scale codebook or precoder in the manner described.

In some arrangements, the set of parameters for codebook selection for each of the at least one port group includes one or more of a rank value or a TPMI. In some arrangements, the rank for each of the at least one port group is the same. In some arrangements, the UE can use the at least one port group for the uplink transmission at 740. For instance, for an uplink transmission with 8 port, the UE can use 2 port groups, each with 4 ports.

In some arrangements, the UE determines a number of layers for the uplink transmission by the rank for the at least one port group. In some examples, the number of layers for the uplink transmission is the same as a rank of one of the at least one port group. In the example in which the UE is configured with 2 port groups, each with 4 ports, and rank of 1 for each TPMI, the UE determines that the number of layer of the uplink transmission is 1. This means that the UE uses 8 ports to transmit 1 layer for the uplink transmission at 740.

In some arrangements, at 730, the UE can combine two or more codebooks (indicated by corresponding TPMIs) by aligning the ranks. In that regard, FIG. 10 is a table 1000 illustrating a method for determining a precoder by combining two precoders with the same rank, in accordance with some arrangements. As shown, the UE can combine a first 4-port precoder (indicated by TPMI=14) and a second 4-port precoder (indicated by TPMI=20) to form an 8-port precoder. Each of the first 4-port precoder and the second 4-port precoder has a rank of 1.

In some arrangements, the network indicates to the wireless communication device two or more TPMIs, each corresponding to a respective one of two or more codebooks. The network can further indicate to the UE, and the UE can receive from the network, an indication that indicates whether two or more codebooks indicated by the corresponding TPMIs are capable of being combined, for example, by aligning the rank.

In some arrangements in which the network configures full power mode 1 for the UE, the UE can transmit one layer for the uplink transmission using ports that are non-coherent in order to reach a higher power level. Determining the precoder based on the at least one port group can be used in such scenario.

In some arrangements in which two or more port groups have different ranks for codebooks corresponding to those port groups, these codebooks can be combined by aligning the ranks. In that regard, FIG. 11 is a table 1100 illustrating a method for determining a precoder by combining two precoders with different ranks, in accordance with some arrangements. As shown, the UE can combine a first 4-port precoder (indicated by TPMI=14) with rank 1 and a second 4-port precoder (indicated by TPMI=16) and rank 2 to form an 8-port precoder. The first 4-port precoder lacks any values in rank 2. As the ranks are aligned to form the 8-port precoder, the missing values are filled with "0" values.

As described the precoder can be determined at 730 by combining two or more codebooks according to an indication from the network. In some examples, determining the precoder according to at least one codebook (e.g., by combining two or more codebooks) includes determining the codebook according one of the following expressions:

$$\begin{bmatrix} W_0 \\ W_1 \\ \dots \\ W_{N-1} \end{bmatrix} \quad (1)$$

$$[W_0 \ \ W_1 \ \ \dots \ \ W_{N-1}] \quad (2)$$

$$\begin{bmatrix} W_0 & 0 & \dots & 0 \\ 0 & W_1 & \dots & 0 \\ \dots & \dots & \dots & \dots \\ 0 & 0 & \dots & W_{N-1} \end{bmatrix}; \quad (3)$$

$$\begin{bmatrix} W_0 \\ \phi_n W_1 \\ \dots \\ \phi_N W_{N-1} \end{bmatrix}; \quad (4)$$

$$[W_0 \ \ \phi_1 W_1 \ \ \dots \ \ \phi_{N-1} W_{N-1}]; \text{ or} \quad (5)$$

$$\begin{bmatrix} W_0 & 0 & \dots & 0 \\ 0 & \phi_1 W_1 & \dots & 0 \\ \dots & \dots & \dots & \dots \\ 0 & 0 & \dots & \phi_{N-1} W_{N-1} \end{bmatrix}, \quad (6)$$

where each of $W_0$, $W_1$, . . . , and $W_{N-1}$ is a matrix of a corresponding one of the at least one codebook (e.g., two or more codebooks), N is a number of the at least one codebook, and $\phi_1$, . . . , $\phi_{N-1}$ are coefficients of $W_1$, . . . , $W_{N-1}$.

In some examples in which the codebook is determined according to expressions (1) or (4), the UE determines that the rank of the precoder is same as the rank of each of $W_0$, $W_1$, . . . , and $W_{N-1}$. In some examples in which the codebook is determined according to expressions (1) or (4), the UE determines that the rank of the precoder is the minimum rank value or the maximum rank value among the ranks of $W_0$, $W_1$, . . . , and $W_{N-1}$.

If values of ranks (e.g., a number of columns of a matrix codebook) of $W_0$, $W_1$, . . . , and $W_{N-1}$ are not equal, and the rank of the precoder is determined by the minimum value of ranks of $W_0$, $W_1$, . . . , and $W_{N-1}$, each of $W_0$, $W_1$, . . . , or $W_{N-1}$ (which has a rank larger than the minimum value) keeps only the first minimum value of layers in the precoder.

If values of ranks of $W_0$, $W_1$, . . . , and $W_{N-1}$ are not equal, and the rank of the precoder is determined by the maximum value of ranks of $W_0$, $W_1$, . . . , and $W_{N-1}$, each of $W_0$, $W_1$, . . . , or $W_{N-1}$ (which has a rank value less than the maximum value) can enlarge its size by adding zeros as elements to obtain the same number of layers as the precoder.

In some examples in which the codebook is determined according to expressions (2) or (5), the UE determines that the number of ports of the precoder is the same as a number of ports of $W_0$, $W_1$, . . . , and $W_{N-1}$. In some examples in which the codebook is determined according to expressions (2) or (5), the UE determines that the number of ports of the precoder is the minimum or the maximum number of ports of $W_0$, $W_1$, . . . , and $W_{N-1}$.

For example, if the numbers of ports (e.g., a number of rows of a matrix codebook) of $W_0$, $W_1$, . . . , and $W_{N-1}$ are not equal, and the numbers of ports of the precoder is determined by the minimum value of numbers of ports of $W_0$, $W_1$, . . . , and $W_{N-1}$, each of $W_0$, $W_1$, . . . , or $W_{N-1}$ (which has a numbers of ports larger than the minimum value) keeps only the first minimum value of numbers of ports in the precoder.

If numbers of ports of $W_0$, $W_1$, . . . , and $W_{N-1}$ are not equal, and the numbers of ports of the precoder is determined by the maximum value of numbers of ports of $W_0$, $W_1$, . . . , and $W_{N-1}$, each of $W_0$, $W_1$, . . . , or $W_{N-1}$ (which has a numbers of ports smaller than the maximum value) can enlarge its size by adding zeros as elements to obtain the same numbers of ports as the precoder.

If the transmitter of the UE can control the phase offset between two Tx (or antenna ports), the two antenna ports are coherent. Otherwise, the two antenna ports are non-coherent. For a number of antenna ports greater than 2 (e.g. 4), the antenna ports are partial-coherent if only part of the antenna ports are coherent. For example, the antenna ports are partial-coherent as antenna ports 0 and 2 are coherent, antenna ports 1 and 3 are coherent, and any other port pairs (e.g., antenna ports 0 and 1, antenna ports 0 and 3, antenna ports 2 and 1, and antenna ports 2 and 3) are not coherent. If all antenna port pairs are coherent, the antenna ports of the UE are full-coherent. In general, only ports which are coherent can be used to transmit a layer of transmission. Non-coherent ports, partial-coherent ports, and full-coherent ports may support different precoders.

In practice, the BS is typically considered to be of high value and can be configured with full-coherent antenna ports. However, different types of UEs may have different level of values. High-value UEs may be configured with full-coherent antenna ports while low-value UEs supports only non-coherent antenna ports. Some UEs may support partial-coherent antenna ports. For the downlink, it only needs to consider codebook with full coherent antenna ports, but for UL, full coherent, partial coherent and non-coherent cases should be all considered. Conventionally, only partial-coherent and non-coherent codebooks are supported for 4 antenna ports. Some arrangements presented herein allow the UE to support partial-coherent and non-coherent codebooks for 6 or 8 antenna ports for the uplink.

In some arrangements, the precoder is determined based on a full-coherent codebook and at least one pattern. In some examples, the pattern can be a typical pattern. In some examples, the UE can determine the pattern according to an uplink 4Tx codebook. Thus, in addition to the information used to determine a full-coherent codebook, the network also provides a pattern indication to the UE. The pattern indication indicates which port is used (or not used) for a layer. A pattern can be also refereed as a port selection pattern. In some arrangements, the UE determines the pattern based on at least one of a pattern indication received by the UE from the network or a predefined rule.

For example, FIG. 12 is a table illustrating an 8-port precoder 1200 for full coherent ports, in accordance with some arrangements. The precoder has a rank of 1 as shown.

In some arrangements, the UE may determine a pattern indication 1 as: port {0, 2, 4, 6} is used. This means port {1, 3, 5, 7} is not used.

In some arrangements, a pattern indication 1 can be indicated as a matrix which has same size as a precoder for full-coherent antennas. For example, FIG. 13 is a table illustrating an example pattern indication 1300, in accordance with some arrangements. As shown, the pattern indication 1300 is a matric having the same size as a precoder for full-coherent antennas. In the pattern indication 130, a value of 1 indicates the corresponding port is used, and a value 0 indicates the corresponding port is not used.

The UE can determine a partial-coherent precoder or a non-coherent precoder as shown in FIG. 14. FIG. 14 is a table illustrating an 8-port precoder 1400 for partial-coherent or non-coherent ports, in accordance with some arrangements. In some examples, the pattern can be a typical pattern (e.g., that shown in FIGS. 13 and 14).

In other examples, the pattern can be determined by the UE according to uplink 4Tx for each part of 4 port. For an 8-port UE with non-coherent ports, the pattern can be indicated from a predefined pattern set (e.g., the pattern is one of a predefined set of patterns) including typical combinations such as:

a. Rank=1, the number of patterns is 8, including port {0}, {1}, {2}, {3}, {4}, {5}, {6}, and {7};
b. Rank=2, the number of patterns is 4, including port combinations of {0, 4}, {1, 5}, {2, 6}, and {3, 7};
c. Rank=3, the number of patterns is 2, including port combinations of {0, 1, 2}, and {4, 5, 6};
d. Rank=4, the number of patterns is 2, including port combination of {0, 1, 2, 3}, and {4, 5, 6, 7};
e. Rank=5, the number of patterns is 2, including port combination of {0, 1, 2, 3, 4}, {0, 1, 2, 3, 6};
f. Rank=6, the number of patterns is 2, including port combination of {0, 1, 2, 3, 6}, {0, 1, 2, 3, 5, 7};
g. Rank=7, the number of patterns is 1, including port combination of {0, 1, 2, 3, 4, 5, 6}; and
h. Rank=8, the number of patterns is 1, including port combination of {0, 1, 2, 3, 4, 5, 6, 7}.

For an 8-port UE with partial-coherent ports, the pattern can be indicated from a predefined pattern set including typical combinations such as:

i. Rank=1, the number of patterns is 2 for 4-port selection, include port {0, 2, 4, 6}, and {1, 3, 5, 7}, or is 4 for 2-port selection, including {0, 4}, {1, 5}, {2, 6}, and {3, 7};
j. Rank=2, number of patterns is 1 for the case that the first layer and second layer are transmitted on a first 4 ports indicated from a first 4-port panel (e.g., a port group), and a second 4 ports indicated from a second 4-port panel, including port {0, 2, 4, 6} for first layer, and port {1, 3, 5, 7} for second layer. In addition, the first layer and the second layer can also correspond to a first 2 ports from a first 4-port/2-port panel and a second 2 ports from a second 4-port/2-port panel, including port {0, 4} for the first layer and port {1, 5} for the second layer, or port {2, 6} for the first layer and port {3, 7} for the second layer.

For rank greater than 2, similar methods can be employed to determine some port selection for each layer. The number of port selection candidates (e.g., pattern candidates) may not be large due to the overhead of pattern indication. FIG. 15 a table 1500 illustrating a number of patterns for full-coherent ports, non-coherent ports, and partial-coherent ports, in accordance with some arrangements. The patterns shown in table 1500 are indicated by the network. That is, the network conveys the patterns shown in table 1500 via suitable signaling such as but not limited to, DCI signaling. Examples of the bits in the DCI signaling are shown in FIG. 16. FIG. 16 is a table 1600 illustrating examples of bits in DCI signaling through which the network indicates the patterns shown in FIG. 15, in accordance with some arrangements. The table 1600 is for codebook mode 1, N1=4, O1=2, N2=1, and O2=1.

In some arrangements, the UE can determine the precoder based on at least one port group (e.g. a 4-port group and a 4-port group, a 4-port group and a 2-port group, three 2-port groups, two 2-port groups, or four 2-port groups). The UE can determine at least one codebook, each of which corresponds to and is used for a respective one of at least one port group. The at least one port group can be used for one uplink transmission. For example, for a UE with 2 port groups, each with 4 ports, the 2 port groups can be used for an uplink transmission with 8 ports.

In some arrangements, a number of layers (or the rank) for the uplink transmission is determined by the rank(s) for the at least one port group (e.g. a sum of all the ranks of the at least one port group). FIG. 17 is a table 1700 illustrating a method for determining a precoder by combining two precoders with different ranks, in accordance with some arrangements. The table 1700 shows generating a rank 3 partial-coherent 8-port precoder by combining a rank 1 4-port precoders with TPMI=14 and a rank 2 4-port precoder with TPMI=16.

In some arrangements, a mapping between a smaller-scale precoding matrix (e.g., a codebook) and a larger-scale precoding matrix of a port index and/or a layer index can be predefined or be determined by parameters communicated to the UE by the network (e.g., by the BS). In other words, the UE can determine the codebook for non-coherent ports, partial-coherent ports, and non-coherent ports with a mapping (e.g., port/layer mapping from a smaller-scale matrix mapped to locations, regions, or elements of a larger-scale matrix).

In some arrangements, the UE can determine the mapping based on a mapping indication received by the UE from the network. The network can communicate, via suitable signaling, the mapping indication. In some arrangements, the UE can determine the mapping based on one or more predefined rules. In some arrangements, the predefined rules include one or more of: (1) a number of ports of the precoder is determined by a sum of number of ports for each codebook of all port groups; (2) a number of ports of the precoder is determined by a sum of maximum number of ports for each port group; (3) ranks for codebooks of all port groups are same, and a rank of the precoder is same as a rank for each codebook of all the port groups; (4) the rank of the precoder is determined by a sum of ranks for each codebook of all port groups; (5) the rank of the precoder is determined by a maximum or a minimum value of ranks for each codebook of all the port groups; or (6) an element in matrix of the precoder which are not determined by the at least one codebook is set to 0. With respect to (1) a number of ports of the precoder is determined by a sum of number of ports for each codebook of all port groups, in response to determining that the rank for a codebook is 0, the number of ports can be non-zero (e.g., 4 or 2, depending on the number of ports configured or indicated for the corresponding port group). With respect to (2) a number of ports of the precoder is determined by a sum of maximum number of ports for each port group, in response to determining that the rank for a codebook is 0, the number of ports can be non-zero (e.g., 4 or 2, depending on the number of ports configured or indicated for the corresponding port group).

Examples of predefined mapping include that the smaller-scale precoding matrix with a lower index (indication order) can be arranged to be a lower index of a port or a layer in a larger-scale precoding matrix, or that the smaller-scale precoding matrix with a lower index (indication order) can be arranged to be a higher index of a port or a layer in a larger-scale precoding matrix.

Examples of determining a mapping by parameters communicated (e.g., indicated) by the network include that the smaller-scale precoding matrix with a lower index (indication order) can be arranged to an lower index of a port or layer in a larger-scale precoding matrix, e.g. within a predefined domain, or that the smaller-scale precoding matrix with a lower index (indication order) can be arranged to an higher index of a port or layer in a larger-scale precoding matrix, e.g. within a predefined domain. Each panel or port group of a smaller-scale codebook or matrix corresponds to a predefined domain (e.g., a predefined port index domain) in a larger-scale matrix. For example, panel 1 and panel 2 correspond to port indexes 0-3 and 4-7 respectively.

For example, port {0, 1, 2, 3} in a smaller-scale precoding matrix can be mapped to port {0, 1, 4, 5}, {2, 3, 6, 7}, {0, 2, 4, 6}, {1, 3, 5, 7}, {0, 3, 4, 7}, or {1, 2, 5, 6}. Such mapping may depend on or correspond to UE capability.

In some arrangements, the mapping indicates at least one of (1) an order of layers of each of the at least one codebook used to determine the precoder; (2) an order of ports of each of the at least one codebook used to determine the precoder; (3) an order of each of the at least one codebook to determine the precoder; (4) a port index mapping between a codebook and the precoder; or (5) a layer index mapping between a codebook and the precoder. With respect to the order of each of the at least one codebook to determine the precoder, the order can be used for both layers and ports of the at least one codebook to determine the precoder. The order can be determined by a predefined method in some arrangements. In some arrangements, the order can be determined according to an index of panel, a panel entity, or a type of panel, each of which corresponds to port group.

In some arrangements, the network can indicate a rank for each of the at least one port group separately or jointly. FIG. 18 is a table 1800 illustrating joint indication based on index values, in accordance with some arrangements. The table 1800 is for Tx (e.g., port) combination {4, 4} having 2 port groups, each with 4 ports (e.g., 4 Tx). A maximum rank (e.g., "Maxrank") is configured by the network (e.g., the BS) for the uplink transmission.

Accordingly, port combination can be flexible within a port group. For example, one port group can be rank 0-4, and another port group can also be rank 0-4, while the sum of all port groups for the uplink transmission is greater than 1. The precoding matrix for each port group can be non-coherent, partial-coherent, or full-coherent independently.

In some arrangements, for an 8-port codebook, a port combination can be {4, 4} as described above, which refers to 2 port groups, each with 4 ports. The 4 ports in a port group are coherent. Ports from different port groups can be coherent or not coherent. In some arrangements, for an 8-port codebook, a port combination can also be {2, 2, 2, 2} or {4, 2, 2}. The port combination {4, 2, 2} refers to 3 port groups, one group with 4 ports and two groups each with 2 ports. For a 6-port codebook, the port combination can be {4, 2} or {2, 2, 2}. TPMI can be indicated for each port group. For example, TPMIs are needed for port combination of {2, 2, 2}.

A rank for each port group can be determined by a joint rank indication or a separate rank indication. For example, the network can separate indicate a rank for each port group explicitly via suitable signaling to the UE (e.g., one index value corresponding to one rank for one port group). Alternatively, the network can jointly indicate a rank for each port group via suitable signaling to the UE (e.g., one index value corresponding to two or more ranks for at least one port group), an example of which is shown in FIG. 18.

According to the above, determining the precoder at 730 includes determining the precoder according to one or more of one codebook, at least one codebook, and at least one of the mapping or the pattern. In some examples, the precoder is determined according to at least one codebook and a mapping. In some examples, the precoder is determined according to one codebook and a pattern. In some examples, the precoder is determined according to the at least one codebook, the mapping, and the pattern. For example, the UE can determine a large-scale codebook by combining two or more codebooks with a mapping, then a pattern is applied to set some elements in the resulting matrix of the large-scale codebook to be zeros.

While various arrangements of the present disclosure have been described above, it should be understood that they have been presented by way of example only, and not by way of limitation. Likewise, the various diagrams may depict an example architectural or configuration, which are provided to enable persons of ordinary skill in the art to understand example features and functions of the present solution. Such persons would understand, however, that the solution is not restricted to the illustrated example architectures or configurations, but can be implemented using a variety of alternative architectures and configurations. Additionally, as would be understood by persons of ordinary skill in the art, one or more features of one arrangement can be combined with one or more features of another arrangement described herein. Thus, the breadth and scope of the present disclosure should not be limited by any of the above-described illustrative arrangements.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according arrangements of the present solution.

Additionally, memory or other storage, as well as communication components, may be employed in arrangements of the present solution. It will be appreciated that, for clarity purposes, the above description has described arrangements of the present solution with reference to different functional units and processors. However, it will be apparent that any suitable distribution of functionality between different functional units, processing logic elements or domains may be used without detracting from the present solution. For example, functionality illustrated to be performed by separate processing logic elements, or controllers, may be performed by the same processing logic element, or controller.

Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

What is claimed is:

1. A wireless communication method, comprising:

receiving, by a wireless communication device from a network, at least one port parameter;

determining, by the wireless communication device, at least one uplink codebook parameter comprising at least one set of parameters for codebook selection, wherein the set of parameters for codebook selection comprises one or more of a rank value or a Transmitted Precoding Matrix Indicator (TPMI), wherein each of the at least one set of parameters for codebook selection corresponds to a respective port group; and determining, by the wireless communication device, a precoder for an uplink transmission based on the at least one uplink codebook parameter and the at least one port parameter, comprising combining codebooks selected using the at least one set of parameters for codebook selection into the precoder, wherein each of the codebooks corresponds to the respective port group, and wherein the precoder for the uplink transmission is determined according to a block diagonal matrix comprising precoding matrices each selected from a respective codebook as a respective block element.

2. The method of claim 1, wherein the at least one port parameter comprises one or more of:

at least one maximum number of ports;

a maximum total rank value; or a number of port groups.

3. The method of claim 1, further comprising reporting, by the wireless communication device to the network, the at least one port parameter.

4. The method of claim 1, wherein the at least one uplink codebook parameter comprises:

at least one set of parameters for codebook set generation.

5. The method of claim 4, wherein the set of parameters for codebook set generation comprises:

at least one of a number of horizontal antenna elements on one polarization, or a number of vertical antenna elements on one polarization.

6. The method of claim 1, wherein the precoder is determined according to:

the codebooks based on the at least one uplink codebook parameter and the at least one port parameter.

7. The method of claim 6, wherein each of the codebooks is determined using a set of parameters for codebook selection of the respective port group to select a codebook from a codebook set of the port group.

8. The method of claim 7, wherein the codebook set is determined using a predefined method or generated according to the parameters for codebook set generation.

9. The method of claim 1, wherein the rank value for each port group is indicated by the network jointly via a same index value.

10. The method of claim 1, wherein determining the precoder according to the codebooks comprises determining the precoder according to:

$$\begin{bmatrix} W_0 & 0 & \dots & 0 \\ 0 & W_1 & \dots & 0 \\ \dots & \dots & \dots & \dots \\ 0 & 0 & \dots & W_{N-1} \end{bmatrix},$$

wherein $W_0$, $W_1$, . . . , $W_{N-1}$, are the matrices of the codebooks, and Nis a number of the codebooks.

11. The method of claim 2, wherein two or more ports in each port group are coherent with each other.

12. The method of claim 6, wherein determining the precoder comprises determining the precoder according to a mapping.

13. The method of claim 12, wherein the mapping indicates at least one of:

a port index mapping between a codebook and the precoder; or a layer index mapping between a codebook and the precoder.

14. The method of claim 12, wherein the mapping is determined based on at least one of:

a number of ports of the precoder is determined by a sum of number of ports for each codebook of all port groups;

the rank of the precoder is determined by a sum of ranks for each codebook of all port groups; or an element in matrix of the precoder which is not determined by the codebooks is set to 0.

15. The method of claim 13, wherein the port index mapping between the codebook and the precoder comprises port {0, 1, 2, 3} in a first precoding matrix mapped to port {0, 1, 4, 5}, and port {2, 3, 6, 7} in a second precoding matrix.

16. A wireless communication method, comprising:

sending, by a network to a wireless communication device, at least one port parameter;

sending, by the network to the wireless communication device, at least one uplink codebook parameter comprising at least one set of parameters for codebook selection, wherein the set of parameters for codebook selection comprises one or more of a rank value or a Transmitted Precoding Matrix Indicator (TPMI), wherein each of the at least one set of parameters for codebook selection corresponds to a respective port group; and receiving, by the network from the wireless communication device, an uplink transmission, wherein the uplink transmission is transmitted by the wireless communication based on a precoder determined according to the at least one port parameter and the at least one uplink codebook parameter, wherein the precoder is combined using codebooks selected using the at least one set of parameters for codebook set selection into the precoder, wherein each of the codebooks corresponds to the respective port group, and wherein the precoder for the uplink transmission is determined according to a block diagonal matrix comprising precoding matrices each selected from a respective codebook as a respective block element.

* * * * *